Jan. 5, 1954
R. W. ATKINSON ET AL
2,665,328
OIL IMPREGNATED ELECTRIC POWER
CABLE WITH FLOW-LIMITING TAPES
Filed July 23, 1947
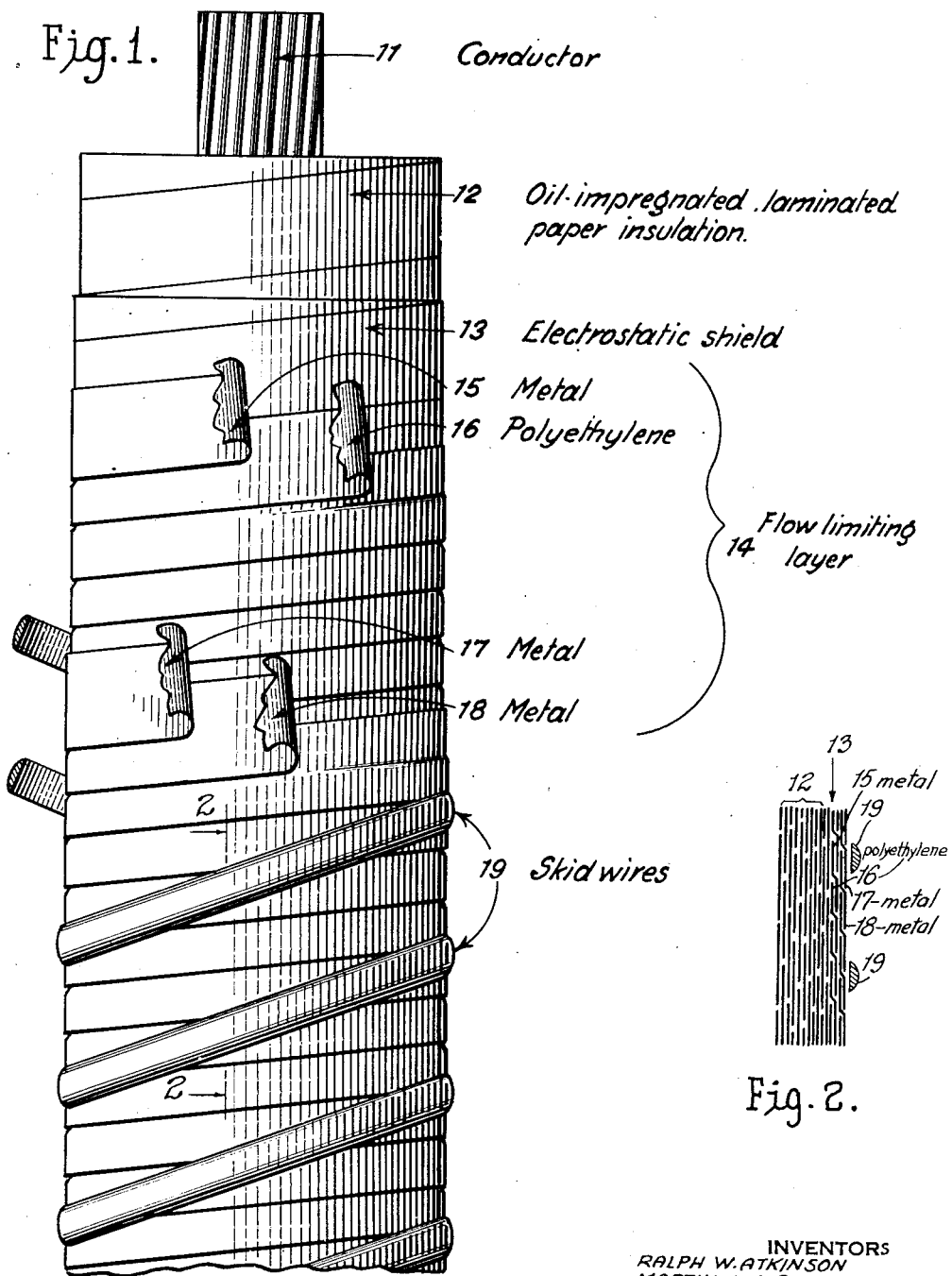
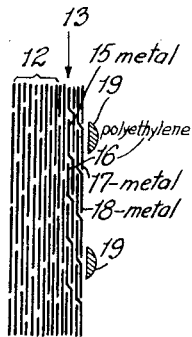
Fig. 2.
INVENTORS
RALPH W. ATKINSON
MARTIN H. McGRATH
BY
Emery, Varney, Whittemore & Dix
ATTORNEYS

Patented Jan. 5, 1954

2,665,328

UNITED STATES PATENT OFFICE 2,665,328

OIL-IMPREGNATED ELECTRIC POWER CABLE WITH FLOW-LIMITING TAPES

Ralph W. Atkinson, Westfield, N. J., and Martin H. McGrath, New York, N. Y., assignors to General Cable Corporation, New York, N. Y., a corporation of New Jersey Application July 23, 1947, Serial No. 763,001

13 Claims. (Cl. 174—25)

This invention relates to insulated electric power cables. More particularly the invention relates to cables comprising one or more conductors insulated with oil-impregnated, laminated paper insulation which are to be pulled into a pipe and the pipe then filled with an insulating fluid, liquid or gaseous, which will be maintained under pressure in excess of atmospheric. One cable system of this character is disclosed, for example, in the Sonnenfeld Patent No. 2,250,239.

It is an object of this invention to provide improved cables for installation in pipes. Other objects and advantages of the invention will appear hereinafter.

Cables which are to be installed in pipes generally are supplied in long lengths which are pulled into steel pipes previously laid in the ground. In order to protect the cables against damage while they are being drawn into the pipes, and also to minimize the pulling tensions required, these cables customarily are provided at the factory with one or more skid or armor wires wrapped with an open lay around the outside of the cable.

The insulating fluid with which the pipe is filled desirably enters and fills all spaces within the cable insulation. Hence there is no need that the cable which is drawn into the pipe include an impervious sheath as a part of its construction. Actually, if the cable were so sheathed prior to installation it might be desirable to open the sheath at intervals, or to remove the sheath entirely, as the cable was drawn into the pipe, so as to facilitate exchange of fluid between the cable insulation and the interior of the pipe during operation of the system. If the sheath were under the skid wires it could be slit, or punctured at intervals; if over the skid wires it could be removed and the material salvaged.

However, the cable insulation normally will comprise oil-impregnated, laminated paper and for that reason it is important that the cable be protected, from the time of its manufacture, during shipment and until it is pulled into the pipe, by a covering or sheath which will substantially prevent drainage of the oil from the insulation and which also will protect the insulation against ingress of moisture.

For reasons already set forth, this covering or sheath need not be, and desirably is not, a hermetic seal, but it should be made from material which is substantially impermeable and nonabsorbent to moisture and should be constructed in such a manner as to retard substantially the drainage of oil from the insulation and the entrance of moisture into the cable interior under conditions such as the cable may be exposed to prior to installation. This flow-limiting layer, as it will be called, should limit flow of fluid into and out of the cable interior sufficiently to prevent any material deterioration in the electrical properties of the cable between the time its manufacture is completed and the time it is installed in the pipe line. Limitation of fluid flow beyond this requirement is unnecessary and, as already indicated, the flow-limiting layer should be pervious to the insulating fluid when the cable is in operation.

Previously it has been the practice to protect cables intended for installation in a pipe line right up to the time of installation by applying a temporary lead sheath over the skid wires at the factory and removing this sheath at the time of installation, just as the cable is pulled into the pipe. That procedure is time-consuming and uneconomical. The lead sheath must be applied at the factory, the shipping weight of the cable is greatly increased as compared to the weight of the cable without the lead sheath, the lead sheath must be removed in the field and then the scrap lead must be returned to the factory, or it may need be sent to the refinery for refining before it can be reused.

Suggestions up to the time of the present invention for replacing the temporary lead sheath with a lighter weight sealing layer which would not have to be removed at the time of installation have involved the use of varnished cambric, or impregnated canvas, or other hygroscopic material, or have depended on wax coatings which are soft or subject to cracking and easily damaged as the cable is handled.

According to the present invention, the cable is provided at the factory with a flow-limiting layer which can be readily applied without special equipment, which is light in weight as compared to a lead sheath, which need not be removed from the cable at the time it is installed by being pulled into a pipe, which adequately protects the cable insulation against harmful drainage of oil and entrance of moisture up to the time it is pulled into the pipe, and which readily permits the exchange of insulating fluid therethrough when the cable is in operation. Obviously, if the sealing layer is not to be removed at the time of installation it should be located underneath the skid wires.

The invention will be best understood from the following description when read in the light of the accompanying drawings showing one specific embodiment of the invention selected merely for descriptive purposes.

In the drawings, Figure 1 is a side elevation of a cable embodying the invention, the elements of the cable being cut back progressively greater distances to disclose the construction more clearly; and Figure 2 is a more or less diagrammatic, fragmentary longitudinal section through the flow-limiting layer, taken substantially on the line 2—2 of Figure 1.

The illustrative embodiment comprises a conductor 11 which is surrounded by a wall 12 of oil-impregnated, laminated paper insulation. The conductor normally will be stranded as illustrated, but this is immaterial to the present invention. If desired, the stranded conductor may be wrapped with one or more metallized paper tapes, or other conducting or semi-conducting tapes, prior to wrapping on the insulating tapes so as to shield the small spaces between the conductor and the inner surface of the insulation against ionization.

The laminated insulating wall 12 may be built up by applying overlying helical wrappings of paper tapes to the desired thickness. These tapes may be pre-impregnated with an insulating oil before they are applied, or they may be mass-impregnated in the conventional manner after they have been applied. If the latter, impregnation will take place before the flow-limiting layer is applied so as to avoid possibility of damage to the tapes of the flow-limiting layer by the high impregnating temperatures.

The outer surface of the insulating wall is provided with an electrostatic shielding layer 13. This layer may comprise a helically wrapped metal tape, for example copper or aluminum, or one or more overlying or intercalated wrappings of metallized paper or other conducting or semi-conducting tapes, or a combination thereof. Customarily the shielding tapes are applied prior to mass-impregnating the insulation.

Over the shielding layer 13 is applied the flow-limiting layer designated 14. The construction of this layer may vary considerably within the scope of the present invention so long as it provides adequate protection for the cable insulation at the pressure differences encountered up to the time of installation and does not have to be opened as the cable is pulled into the pipe line to permit the flow of insulating fluid when the cable is in operation. The flow-limiting layer 14 of the present invention comprises a multiple helical wrapping of tapes of different materials, for example metal and synthetic non-metallic material, which in themselves are each substantially impermeable and non-absorbent to moisture.

The metal tapes in the flow-limiting layer ordinarily will be copper or aluminum. In the illustrative embodiment the flow-limiting layer comprises three metal tapes, designated 15, 17 and 18, but the number of metal tapes may be varied. While the dimensions may vary with cable size and other factors, dead soft copper tapes 0.003" thick and 0.75" wide will be suitable in most instances.

The non-metallic tapes in the flow-limiting layer should include no hygroscopic material and this requirement eliminates from consideration all paper, cotton and other cellulose base tapes. In the illustrative embodiment the flow-limiting layer comprises a single non-metallic tape, designated 16, but it may include more than one non-metallic tape. The material should be substantially impermeable and non-absorbent to moisture. A material which meets these requirements to a very high degree is polyethylene, which is a thermoplastic resin produced by polymerizing ethylene under high pressure and elevated temperatures as described in U. S. Patents Nos. 2,153,553 and 2,188,465.

Conveniently the polyethylene tapes may be about 0.007" thick and 0.75" wide, but it will be understood that these dimensions may vary depending on the cable size, the dimensions of the metal tapes and other factors. In the illustrative embodiment, tape 16 is a polyethylene tape.

Referring again to the drawing, it will be seen that immediately over the shielding layer 13 is a helical wrapping consisting of overlapping tapes 15 and 16. Preferably one of these tapes 15 is made of metal and the other tape 16 of synthetic material such as polyethylene. Preferably the two tapes, overlapped, are wrapped on together so that each turn of the synthetic tape 16 underlies a part of one turn of the metal tape 15 and overlies a part of an adjacent turn of the metal tape. Tapes wrapped on so as to overlap in this manner, whether of the same or different materials, will be referred to herein as intercalated tapes.

Over the intercalated wrapping 15—16, in the illustrative embodiment, is a second intercalated wrapping, the two tapes 17 and 18 of this wrapping preferably being metal. Applied helically around the cable over the wrapping 17—18 are two D-shaped skid wires 19 to protect the cable against injury and to reduce pulling tension when the cable is drawn into a pipe.

In the illustrative embodiment the cable shielding layer 13 is made electrically continuous, through direct contact with the metal tape 15 of the intercalated wrapping 15—16 and direct contact of the tape 15 with the intercalated metal tape wrapping 17—18, with the skid wires 19 which are in direct contact with the metal tapes 17 and 18 and will be in contact with the pipe after the cable has been installed. With such an arrangement no further grounding of the shield 13 will be necessary.

If other ways of grounding the shield 13 are conveniently available, or if such grounding is not necessary, or not desired, then both of the tapes 15 and 16 may be made of synthetic material substantially impermeable and non-absorbent to moisture, for example polyethylene. Alternatively the tapes 15 and 16 may be replaced by a single synthetic tape wrapped on with an overlap.

The flow-limiting layer of this invention comprises a multiple wrapping of tapes of different materials. One of these tape wrappings, metal in the illustrative embodiment, has a relatively high modulus of elasticity so that it stretches less easily and reinforces and protects the other tape wrapping. The other tape wrapping is a homogeneous synthetic material which is highly impervious and non-absorbent to moisture. At the atmospheric pressures encountered prior to installation of the cable this tape wrapping functions somewhat like a gasket as it is pressed against or between the turns of the metal tape or tapes. The resulting composite layer substantially limits or prevents flow of fluid therethrough at pressures encountered prior to installation.

Polyethylene is outstanding among non-metallic materials for its low rate of transmission of water vapor and for its low water absorption. Water brought into contact with polyethylene does not wet the surface thereof. Moreover, prolonged contact between polyethylene and oils used for impregnating paper insulated cables does not result in deterioration of the electrical properties of the oil. Other non-metallic materials are available which could be used, including polytetrafluoroethylene (Teflon) and nylon.

Metals are even more impervious and non-absorbent to moisture than polyethylene and for that reason a flow-limiting layer composed exclusively of metal might seem preferable. Some of the objections to the use of lead for this purpose have already been mentioned. All-metal layers formed by wrapping on copper or aluminum tapes cannot be relied upon safely to provide adequate protection for the cable insulation against loss of oil and penetration of moisture prior to installation in the pipe unless the edges of the tape turns are soldered or otherwise united. Soldering tape turns together as they are wrapped on a cable presents serious difficulties and even if it could be done economically and without damage to the cable insulation the construction would be mechanically weak and subject to tearing at the seams, or rupture of the tapes, as the cable is handled between manufacture and installation.

According to the present invention the intercalated wrapping 15—16 of metal and synthetic tapes provides coverage for the cable insulation which is largely metal. Adjacent turns of the metal tape are separated from each other by about 5% to 15% of their width. This 5% to 15%, or so, of the cable surface which is not covered by the metal tape is covered by the substantially impervious and non-absorbent synthetic tape which, because of the intercalated construction, functions as a gasket between adjacent turns of the metal tape for small pressure differentials such as the cables will be subjected to while exposed to the atmosphere prior to being pulled into the pipe line.

An additional intercalated wrapping of metal and synthetic tapes similar to the wrapping 15—16 may be applied over the wrapping 15—16 prior to applying the all-metal wrapping 17—18, if desired. This would further reduce the possibility of flow of fluid through the flow-limiting layer 14 prior to installation.

The all-metal wrapping 17—18 functions to protect the underlying synthetic tape material from damage by the skid wires 19 as they are applied under tension to the cable. If the skid wires were applied directly over the synthetic tape the pressure exerted by the edges of the wires on the tapes might crease or cut the synthetic material. The metal separator between the synthetic and the skid wires distributes the pressure exerted by the skid wires on the synthetic tape and reduces danger of damage.

A preferred form of separator comprising intercalated metal tapes 17 and 18 is illustrated in the drawing, but it is within the scope of the present invention to employ one or several metal tapes applied with adjacent turns in each layer butting, or with turns overlapping, or intercalated, depending on the number, width and thickness of the metal tapes and on other factors. Desirably there is at least one thickness of metal tape separating and protecting the synthetic tape of the flow-limiting layer from the skid wires.

The wrapping 17—18 also plays a part in limiting the flow of fluid into and out of the cable up to the time it is installed in the pipe. The intercalated metal tapes 17—18 provide a complete metal coverage for the cable and when applied under controlled tension with large overlap the opportunity for fluid flow between adjacent turn edges is small for the small differential pressures to which it may be subject during storage and shipment. Moreover, the synthetic tape or tapes of the underlying wrapping 15—16 will be pressed, and function as a gasket, between the metal tape (if present) with which it is intercalated and the overlying all-metal wrapping 17—18 and will bridge adjacent turns in the all-metal wrapping 17—18.

Skid wires employed on electric cables commonly are substantially half-round in transverse section and are applied with the flat surface bearing against the cable so that pressure will be distributed over the cable surface. The edges of the skid wires customarily are rounded slightly to reduce further the danger of damage to the cable insulation, and as a result the minor dimension of a transverse section through the skid wire may exceed one-half the major dimension of the section. The skid wires usually are made of copper, or aluminum, or alloys of one or the other. Desirably they are applied in the same helical direction as the tapes of the flow-limiting layer, so as to reduce danger of damage to that layer.

According to this invention the skid wires 19 may be flattened, as compared to the half-round wires, for the purpose of further distributing the bearing pressure over the cable surface and to reduce slightly the over-all diameter of the cable. In transverse section the skid wires will resemble half an ellipse which has been divided on its major axis, or the smaller part of a circle divided by a chord which is not the diameter. For example, a skid wire which is 0.067″ by 0.300″ and approximately semi-elliptical in transverse section will have about the same cross section as a 0.100″ by 0.200″ half-round skid wire. The semi-elliptical wire will have about the same abrasion resistance and exert about the same frictional drag as the cable is pulled into a pipe, but will have a 50% greater bearing surface on the cable than the half-round wire. The important feature is that the minor dimension of a transverse section through the skid wire be less than one-half the major dimension of the section.

When precautions are taken to protect the cable against exposure to the elements by use of a reel as hereinafter described, the flow-limiting covering is effective to protect the cable insulation against drainage of oil from the insulation and against entrance of moisture in amounts which would be injurious to the insulation from the time of manufacture up to the time when the cable is pulled into the pipe line. Under operating conditions of the cable this flow-limiting covering readily permits exchange of insulating fluid between the laminated paper insulation and the space within the pipe surrounding the cable.

Any danger of air or moisture flowing into the cable in amount sufficient to result in any harmful deterioration of the cable insulation under conditions normally encountered prior to installation, slight as it is, can be further reduced by maintaining a slight positive internal pressure on the cable from the time of manufacture until the time of installation. This may be done by capping the ends of the completed cable and by connecting to one end, as through a connection to the cap, a reservoir containing insulating oil, or an inert gas such as nitrogen, under pressure.

The polyethylene tape may gradually disintegrate in the cable oil. This action will be slow, particularly as long as the cable is not subjected to operating load cycles, and may be disregarded as far as the present invention is concerned. The polethylene taken up by the cable oil will not adversely affect the electrical properties of the cable.

Since the flow-limiting layer of the present invention remains on the cable when it is pulled into the pipe it will be evident that its protects the cable insulation during installation as well as prior to installation. Thus the cable is protected against drainage of oil and entrance of moisture while it is being pulled into the pipe and while it is being connected into the system and during all other operations until the system is dried and evacuated and pressure is applied initially to the insulating fluid with which the pipe is filled.

The cable of this invention desirably will be shipped to the place of installation on a watertight reel in an atmosphere of low and substantially constant relative humidity. If this is not done moisture may condense on the cable during shipment and in the field prior to installation as a result, e. g. of falling temperature. This will require special drying of the cable before it is pulled into the pipe in order to prevent the condensed moisture being carried into the pipe on the exterior of the cable, or else extra drying of the pipe line after the cable has been pulled in. A suitable watertight reel is disclosed in a copending application of Ralph W. Atkinson and Oscar G. Garner for Cable Reel and Method, filed July 23, 1947, Serial No. 763,002, now Patent No. 2,616,780, dated November 4, 1952, assigned to the assignee of the present application.

The scope of the invention herein disclosed is set forth in the subjoined claims and the specific embodiments described hereinabove are illustrative only.

We claim:

1. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, a composite flow-limiting layer enclosing said insulated, shielded conductor and constituting a covering over all of the hygroscopic material in the cable construction to retard drainage of oil from the cable and entrance of moisture into the cable prior to installation, said composite flow-limiting layer comprising a multiple helical wrapping of tapes of metal and homogeneous insulating material each substantially impermeable and non-absorbent to moisture, the metal reinforcing and protecting the homogeneous insulating material which limits or prevents flow of fluid through interstices between adjacent metal turns under conditions to which the cable is exposed prior to installation and which readily permits the exchange of fluid under operating conditions, and a skid wire member wrapper helically over the composite flow-limiting layer, the skid wire member being separated from the homogeneous insulating material by at least one thickness of the aforesaid metal tape.

2. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, and a composite flow-limiting layer enclosing said insulated, shielded conductor and constituting a covering over all of the hygroscopic material in the cable construction to retard drainage of oil from the cable and entrance of moisture into the cable prior to installation, said composite flow-limiting layer fitting closely around and being supported by the insulated and shielded conductor and comprising a multiple helical wrapping of tapes of metal and homogeneous insulating material each substantially impermeable and non-absorbent to moisture, the metal reinforcing and protecting the homogeneous insulating material which limits or prevents flow of fluid through interstices between adjacent metal turns under conditions to which the cable is exposed prior to installation and which readily permits the exchange of fluid under operating conditions.

3. An electric cable according to claim 2, characterized by the fact that the homogeneous insulating material may gradually disintegrate in the cable oil without adversely affecting the electrical properties of the cable.

4. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, a composite flow-limiting layer enclosing said insulated, shielded conductor and constituting a covering over all of the hygroscopic material in the cable construction to retard drainage of oil from the cable and entrance of moisture into the cable prior to installation while readily permitting the passage of fluid therethrough during operation of the cable, said composite flow-limiting layer comprising intercalated, helically wrapped tapes of metal and a homogeneous insulating material each of which is substantially impermeable and non-absorbent to moisture and a helically applied metal tape wrapping over the intercalated tapes, and a skid wire member wrapped helically over the metal tape wrapping to protect the cable when it is drawn into a pipe and to minimize the pulling tension required.

5. An electric cable to be pulled into a pipe which will then be filled with an insulating fluid and maintained under pressure comprising, in combination, a conductor, a wall of oil impregnated, laminated paper insulation enclosing the conductor, an electrostatic shielding layer over the paper insulation, a flow-limiting layer enclosing said insulated, shielded conductor and constituting a covering over all of the hygroscopic material in the cable construction to retard drainage of oil from the cable and entrance of moisture into the cable prior to installation while readily permitting the passage of fluid therethrough during operation of the cable, said flow-limiting layer fitting closely around and being supported by the insulated and shielded conductor and comprising intercalated, helically wrapped tapes of different materials, one of which has a relatively high modulus of elasticity so that it stretches less easily than the other and the other of which functions as a gasket between adjacent turns of the first tape, the tapes themselves being substantially impermeable and non-absorbent to moisture.

6. An electric cable according to claim 5, characterized by the fact that when prior to installation the pressure within the flow-limiting layer exceeds the exterior pressure, the tapes having a relatively low modulus of elasticity are pressed against and supported exteriorly by the tapes having a relatively high modulus of elasticity, so that the former substantially seal the small passageways between the turns of the latter to minimize escape of oil and entrance of moisture.

7. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, and a flow-limiting layer enclosing said insulated, shielded conductor and constituting a covering over all of the hygroscopic material in the cable construction to retard drainage of oil from the cable and entrance of moisture into the cable prior to installation while readily permitting the passage of fluid therethrough during operation of the cable, said flow-limiting layer fitting closely around and being supported by the insulated and shielded conductor and comprising intercalated, helically wrapped tapes, of metal and a synthetic resinous material each of which is substantially impermeable and non-absorbent to moisture.

8. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, and a flow-limiting layer enclosing said insulated, shielded conductor and constituting a covering over all of the hygroscopic material in the cable construction to retard drainage of oil from the cable and entrance of moisture into the cable prior to installation while readily permitting the passage of fluid therethrough during operation of the cable, said flow-limiting layer fitting closely around and being supported by the insulated and shielded conductor and comprising intercalated, helically wrapped tapes of metal and polyethylene.

9. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, and a flow-limiting layer enclosing said insulated, shielded conductor and constituting a covering over all of the hygroscopic material in the cable construction to retard drainage of oil from the cable and entrance of moisture into the cable prior to installation while readily permitting the passage of fluid therethrough during operation of the cable, said flow-limiting layer fitting closely around and being supported by the insulated and shielded conductor and comprising an overlapping, helically applied tape wrapping of synthetic resinous material which is substantially impermeable and non-absorbent to moisture, the oil within the paper insulation being maintained under pressure above atmospheric prior to installation in the pipe.

10. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, and a flow-limiting layer enclosing said insulated, shielded conductor and constituting a covering over all of the hygroscopic material in the cable construction to retard drainage of oil from the cable and entrance of moisture into the cable prior to installation while readily permitting the passage of fluid therethrough during operation of the cable, said flow-limiting layer comprising intercalated, helically wrapped tapes of metal and flexible, homogeneous insulating material, the oil within the paper insulation being maintained under pressure above atmospheric prior to installation in the pipe.

11. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, and a flow-limiting layer enclosing said insulated, shielded conductor and constituting a covering over all of the hygroscopic material in the cable construction to retard drainage of oil from the cable and entrance of moisture into the cable prior to the installation while readily permitting the passage of fluid therethrough during operation of the cable, said flow-limiting layer comprising an overlapping, helically applied tape wrapping of polyethylene.

12. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, a flow-limiting layer enclosing said insulated, shielded conductor and constituting a covering over all of the hygroscopic material in the cable construction to retard drainage of oil from the cable and entrance of moisture into the cable prior to installation while readily permitting the passage of fluid therethrough during operation of the cable, said flow-limiting layer comprising intercalated, helically wrapped tapes of metal and polyethylene, and an overlying, helically applied metal tape wrapping, and a D-shaped skid wire member wrapped helically over the flow-limiting layer.

13. An electric cable to be pulled into a pipe which will then be filled with an insulating fluid and maintained under pressure comprising, in combination, a conductor, a wall of oil-impregnated, laminated paper insulation enclosing the conductor, an electrostatic shielding layer over the paper insulation, and a flow-limiting layer enclosing said insulated, shielded conductor and constituting a covering over all of the hygroscopic material in the cable construction to retard drainage of oil from the cable and entrance of moisture into the cable prior to the installation while readily permitting the passage of fluid therethrough during operation of the cable, said flow-limiting layer comprising a layer of polyethylene completely covering the cable and an overlying, helically applied metal tape wrapping.

RALPH W. ATKINSON.
MARTIN H. McGRATH.

References Cited in the file of this patent

UNITED STATES PATENTS

| Number | Name | Date |
|---|---|---|
| 593,842 | Greenfield | Nov. 16, 1897 |
| 2,102,974 | Robinson | Dec. 21, 1937 |
| 2,155,243 | Safford | Apr. 18, 1939 |
| 2,222,932 | Bennett | Nov. 26, 1940 |
| 2,377,153 | Hunter et al. | May 29, 1945 |
| 2,516,747 | Bennett | July 25, 1950 |

OTHER REFERENCES

Thomas et al., J. Ind. & Eng. Chem., March 1940, page 301.

An article "A new dielectric for cables" by H. C. Crafton, Jr., and H. B. Slade in "Modern Plastics" for July 1944; pages 90–93.

Bullard et al., Trans. A. I. E. E., vol. 67, Part I (1948), page 479.